United States Patent [19]
Allen, Jr.

[11] 3,906,507
[45] Sept. 16, 1975

[54] COMBINATION GLIDESLOPE/LOCALIZER ANTENNA FOR AIRCRAFT

[75] Inventor: William P. Allen, Jr., Atlanta, Ga.

[73] Assignee: Lockheed Aircraft Corporation, Burbank, Calif.

[22] Filed: Mar. 27, 1974

[21] Appl. No.: 455,262

[52] U.S. Cl. ............... 343/705; 343/742; 343/744; 343/846; 333/84 M
[51] Int. Cl.² .......................................... H01Q 1/28
[58] Field of Search .......... 333/84 M; 343/846, 106, 343/108, 705, 742, 744

[56] References Cited
UNITED STATES PATENTS

| | | | |
|---|---|---|---|
| 2,836,798 | 5/1958 | Le Vine | 333/84 M |
| 2,951,218 | 8/1960 | Arditi | 333/84 M |
| 3,471,812 | 10/1969 | Lackner | 333/84 M |
| 3,680,136 | 7/1972 | Collings | 343/846 |

Primary Examiner—Richard A. Farley
Assistant Examiner—T. M. Blum
Attorney, Agent, or Firm—Billy G. Corber; John J. Sullivan

[57] ABSTRACT

A combination glideslope/localizer antenna suitable for mounting on the forward bulkhead in the radome area of an aircraft provides two suitably isolated connectors for receiving glideslope and localizer signals for the aircraft instrument landing system. The two radiating elements are a special arrangement of split loops, making use of microstrip techniques in their feed systems.

6 Claims, 2 Drawing Figures

PATENTED SEP 16 1975
3,906,507
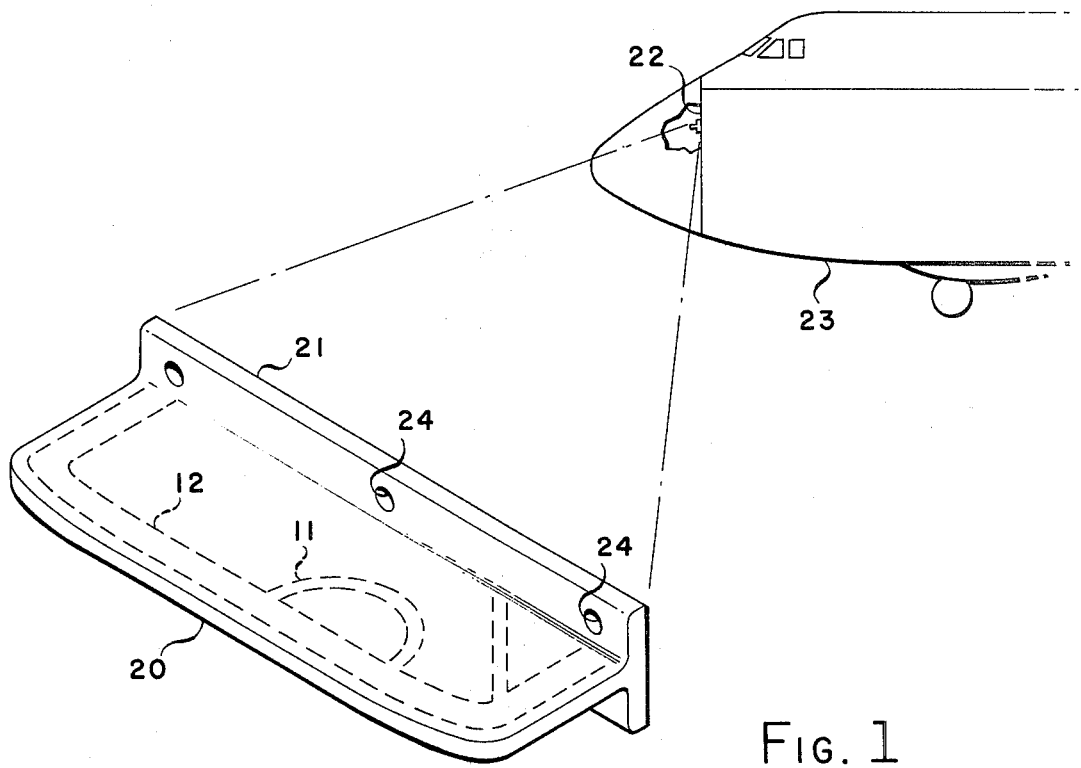
Fig. 1
Fig. 2
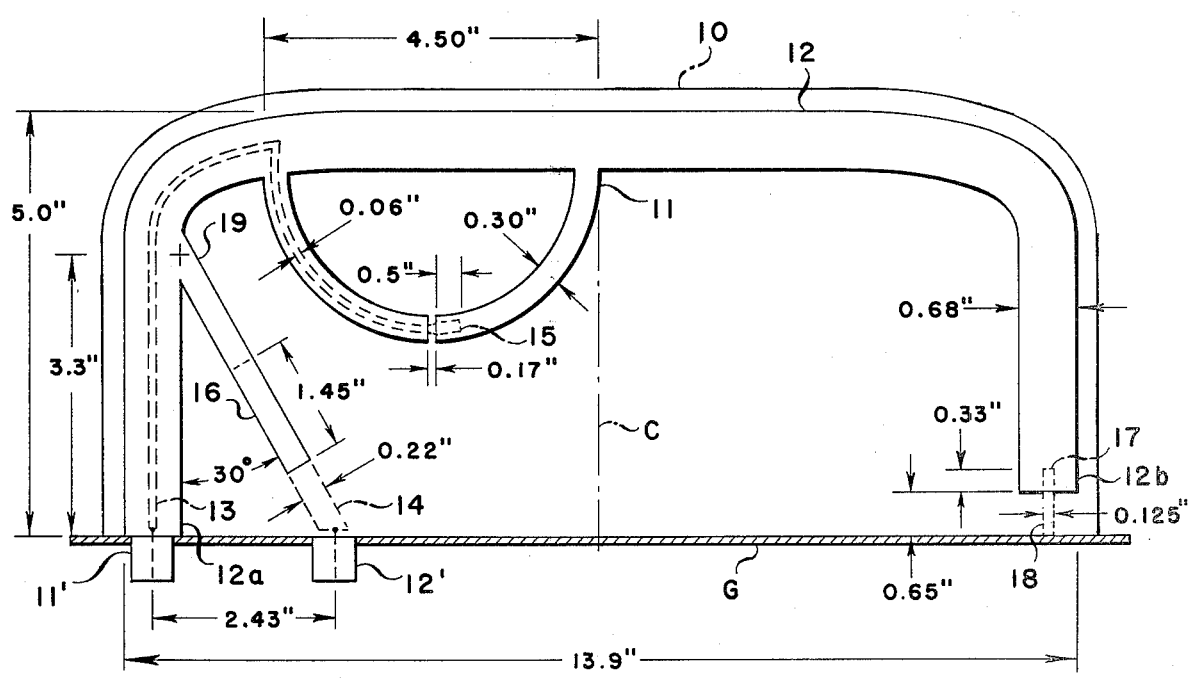

COMBINATION GLIDESLOPE/LOCALIZER ANTENNA FOR AIRCRAFT

This invention relates to antennas generally, and to antennas as employed on aircraft in particular.

The many electronic systems of airborne vehicles today require a multiplicity of antennas on the aircraft which present problems from several aspects, such as electromagnetic interference, cost, weight, available space, and drag. These factors are magnified substantially in the design of cost effective STOL aircraft and in heavily electronics-oriented military aircraft.

It has been established that the drag for one external antenna on existing aircraft currently in service can amount to as much at 180 pounds. On the other hand, the expense of structural mounting, functional tests, and installation of antennas internally of the aircraft must be added to the initial cost of the antenna itself. Thus, the total cost becomes appreciable especially as the number of antennas is increased.

The present invention contemplates alleviating the foregoing as well as other problems to some extent by combining two antennas in a single envelope. Such a combination, however, must be done in a very judicious manner inasmuch as the antenna location on the aircraft is determined, to some extent, by the function of the electronic equipment to which it is connected. Moreover, only systems that will be electromagnetically compatible can be combined in the same envelope.

The broad concept of combining antennas is not novel. Such combined antennas, however, are sometimes quite expensive and large, requiring a special aircraft structure for installation. The present trend in aircraft of using an automatic landing system is toward the use of separate receivers for the instrument landing system (ILS) and the visual omni-range (VOR) and not sharing the VOR antenna for ILS. The normal installation is then to permanently connect a VOR antenna to the VOR receiver and a localizer antenna to the ILS receiver without the use of a coaxial switch for selective use of the VOR antenna. This makes it necessary to provide two separate locations on the forward bulkhead of the aircraft for the glideslope and localizer antennas. This forward bulkhead location for these two antennas is required because of the function of the glideslope and localizer equipment. Both of these locations must be chosen to minimize the impact of pattern modulation caused by the radar dish antenna due to its normal movement. Limited space within the aircraft nose radome area serves to compound the problem.

It is anticipated that a great many aircraft including practically all large military and commercial aircraft using automatic guidance onto the runway will require a separate localizer antenna on the forward fuselage bulkhead instead of sharing the VOR antenna on the tail structure. Since this bulkhead defines a relatively small space when considering the equipment to be accommodated therein, a combined glideslope/localizer antenna is highly desirable.

It is the primary purpose of this invention to provide such a combined antenna package, equally applicable to all aircraft but especially useful on STOL and the larger aircraft, which is inexpensive and lends itself to installation on current production aircraft. To this end it is herein proposed to integrate the glideslope and localizer antennas into a compact assembly especially designed and adapted to be operatively mounted on the forward fuselage bulkhead. More specifically, this assembly is secured in an immovable position on a support which in turn is embedded within a protective case of dielectric material by and through which it is mounted to the bulkhead.

With the above and other objects in view as will be apparent, this invention consists in the construction, combination and arrangement of parts all as hereinafter more fully described, claimed and illustrated in the accompanying drawings wherein:

FIG. 1 is a side elevation of the forward portion of a typical aircraft fuselage to illustrate the relative location therein of a combined glideslope/localizer antenna as herein proposed, the antenna assembly being withdrawn and shown in perspective for a clearer view of its housing in which it is embedded; and FIG. 2 is a plan view of the combined glideslope/localizer antenna per se removed from its housing to show primarily each half loop antenna configuration and the mounting of the two antennas in immovable position on their common support.

Referring more particularly to FIG. 2 of the drawings, 10 designates a support or substrate of dielectric material such as, for example, a standard fiberglass printed circuit board on one side of which a pair of half loop antennas 11 and 12 are, for example, etched using standard photo etch techniques. Typically, these loops 11 and 12 are each copper and may be topped by a protective coat of tin, if desired, although the only essential requirement is that these loops 11 and 12 are electrically conductive.

Each of these antenna loops 11 and 12 is configured to resonate at a predetermined frequency corresponding to that of the associated localizer and glideslope equipment. Thus, the larger loop 12 is tuned for the localizer frequency of about 108 to 118 megahertz while the smaller loop 11 is tuned for the glideslope frequency of about 327 to 335 megahertz.

Microstrip technique is used to feed each loop 11 and 12 through an appropriate connector 11' and 12' respectively glideslope and localizer receivers. To this end a microstrip feed line 13 from the loop 11 to its connector 11' is, for example, etched on the opposite side of the printed circuit board 10 from the half-loops 11 and 12. The amount of microstrip overlap at the break in the loop 11 makes up a series capacitor 15 which tunes the glideslope loop 11 to the desired frequency within the range of about 327 to 335 megahertz.

A shunt feed line 19 from the loop 12 is connected to its connector 12' through a strip 14. More specifically, the shunt feed line 19 comprises a diagonal extension of electrically conductive material which joins the ede of the larger loop 12 between the smaller loop 11 and its connector 11' and is coupled to the conductive strip 14 through a capacitor 16. Capacitor 16 may be effected in a manner similar to capacitor 15, however, it is employed for impedance matching of the larger loop 12, i.e., it nulls out the inductive reactance of the shunt feed line 19 to its receiver.

A capacitor 17 similar in all respects to the capacitor 15 is produced at the end of the localizer loop 12 and connected to ground, indicated generally at G, by means of and through a conductor 18 (or trace as it is called in the vernacular). The capacitor 17 tunes the localizer loop 12 to the desired frequency within the range of about 108 to 118 megahertz.

The capacitance expressed in picofarads (or as it has been previously called micromicrofarads) of the several capacitors 15, 16, and 17 is established by the following formula:

$$C = \frac{0.2248 \, AK}{t}$$

where: K is the dielectric constant of substrate 10;
A is the area of overlap (in square inches) of the associated conductive materials; and
$t$ is the thickness of the substrate 10 (in inches).

The microstrip line 13 is made to have an impedance equivalent to that of the conductor or cable to the glideslope receiver which in aircraft is standard at near 50 ohms. Such a characteristic impedance may be assured by means of and through the use of a time domain reflectometer.

In the particular embodiment illustrated, the larger half-loop has a transverse dimension on the order of about 0.68 inch and measured along its centerline has a length of approximately 20.2 inches. The smaller loop 11 has a transverse dimension on the order of about 0.30 inch and measured along its centerline has a length of approximately 6.6 inches.

The thickness of the substrate 10 is approximately 0.03 inch. The length of the overlap of the microstrips or conductors 13, 14, and 18 with the associated parts of loops 11 and 12 which, as stated, produces the capacitors 15, 16, and 17 is about 0.17 inch in the case of the capacitor 15, about 1.45 inch in the case of the capacitor 16, and about 0.33 inch in the case of capacitor 17. The transverse dimension of the microstrips or conductors 13, 14, and 18 is about 0.06 inch, 0.22 inch and 0.125 inch respectively so that the area of overlap is approximately 0.0102 sq. inch in the case of the capacitor 15, approximately 0.319 sq. inch in the case of the capacitor 16 and approximately 0.04125 sq. inch in the case of capacitor 17. Applying the above formula the capacitance of the several capacitors 15, 16 and 17 are on the order of 0.518 pf., 9.7 pf. and 1.25 pf. respectively.

The loops 11 and 12 are arranged as illustrated in FIG. 2 with the opposite end portions 12a and 12b of the larger loop 12 substantially perpendicular to ground G and generally symmetrical about a centerline C drawn perpendicular to ground G. One end of the larger loop 12 terminates at ground G while the other end terminates about 0.65 inch short of ground G to which it is effectively connected by means of and through the conductor 18. The overall distance of the larger loop 12 from end portion 12a to end portion 12b is 13.9 inches plus or minus 10 percent while the overall distance from the outermost edge of the loop 12 to ground G is 5.0 inches plus or minus 10 percent. It is to be understood that a variance of either of these dimensions in either direction requires a variant of the other dimension in the opposite direction so that the total linear measurement of about 20.2 inches for the larger loop 12 remains intact.

The connector 12' is located between connector 11' and the centerline C so as to be a distance of about 2.43 inches centerline-to-centerline from the connector 11'. The diagonal extension 19 is connected to the larger loop 12 at a distance approximately 3.3 inches from (when measured perpendicular to) ground G, making an angle of approximately 30° with the larger loop end portion 12a.

The smaller loop 11 is substantially hemicircular in form with opposite ends joining the edge of the larger loop 12 on the side thereof nearer ground G so as to locate the smaller loop 11 between the larger loop 12 and ground G. The smaller loop 11 has an outside diameter of approximately 4.5 inches being located between the centerline C and the diagonal extension 19 with one edge substantially tangent to the centerline C.

Referring specifically to FIG. 1, the antenna assembly as above described is adapted to be inserted or otherwise embedded in a protective housing 20 fabricated of dielectric material, e.g., fiberglass. Housing 20 is provided with a flange 21 or the equivalent to position the antenna assembly as desired with respect to stationary structure such as a bulkhead 22 within the nose of an aircraft 23. To facilitate this, mounting holes 24 are provided in the flange 21 of the housing 20.

While the invention has been hereinabove illustrated and described in what is believed to be its best and most practical form under present-day conditions, it is recognized that under other conditions this form would be modified. No attempt has been made to specifically incorporate any of such other forms in this disclosure in the interest of clarity of the total inventive concept. The claims are relied upon to cover these other forms generally.

What is claimed is:

1. A combination glideslope/localizer antenna for aircraft comprising:

a first and a second half-loop of electrically conductive material disposed in a common plane, said first half-loop having opposite ends connected to ground with end portions substantially perpendicular to said ground and generally symmetrical about a centerline drawn perpendicular to said ground, and said second half-loop being substantially hemicircular with opposite ends joining the edge of said first half-loop on the side thereof proximate said ground to thereby be substantially enclosed by said first half-loop;

a shunt feed line operatively connected to said first half-loop, said shunt feed line including means for impedance matching of said first half-loop;

a connector individual to a receiver for each glideslope and localizer antenna, the localizer receiver connector being electrically coupled to said shunt feed line;

a break in the electrical continuity of each said half-loop, the break in said first half-loop being located on the remote end thereof with reference to said shunt feed line;

a capacitor in the length of each said half-loop at said break;

a first conductor operatively connected between the capacitor associated with the second half-loop break aforesaid and its connector;

and a second conductor operatively connected between the capacitor associated with the first half-loop break aforesaid and ground.

2. The antenna of claim 1 wherein one outside edge of said second half-loop is generally tangent to said centerline and said shunt feed line is located between the other outside edge of said second half-loop and the adjacent first half loop end portion.

3. The antenna of claim 2 including a substrate of dielectric material and wherein said first and second half-loops and said shunt feed line are disposed on one surface thereof, said conductors are each disposed on the opposite surface thereof, and each said capacitor is formed by an overlap in the length of each half-loop and each said conductor.

4. The antenna of claim 3 wherein said substrate has a thickness of about 0.03 inch, said first half-loop has a transverse dimension on the order of about 0.68 inch and a length of approximately 20.2 inches measured along its centerline and the overlap aforesaid in its length has an area of about 0.319 square inch to thereby tune said first half-loop to a frequency of about 108 to 118 megahertz, and said second half-loop has a transverse dimension on the order of about 0.30 inch and a length of approximately 6.6 inches measured along its centerline and the overlap aforesaid in its length has an area of about 0.0102 square inch to thereby tune said second half-loop to a frequency of about 327 to 335 megahertz.

5. The antenna of claim 3 wherein said means for impedance matching is a capacitor formed by a diagonal extension of conductive material disposed on said one substrate surface and a conductive strip disposed on said opposite substrate surface in overlap relation with each other.

6. The invention of claim 5 including a protective housing of dielectric material adapted to receive and enclose said antenna, and a mount carried by said housing to facilitate its connection to stationary structure of said aircraft.

* * * * *